United States Patent [19]
D'Avello

[11] Patent Number: 5,963,848
[45] Date of Patent: *Oct. 5, 1999

[54] METHOD AND APPARATUS FOR ASSIGNING A CHANNEL TO A MOBILE UNIT IN A WIRELESS COMMUNICATION SYSTEM

[75] Inventor: Robert Faust D'Avello, Lake Zurich, Ill.

[73] Assignee: Motorola, Inc., Schaumburg, Ill.

[*] Notice: This patent issued on a continued prosecution application filed under 37 CFR 1.53(d), and is subject to the twenty year patent term provisions of 35 U.S.C. 154(a)(2).

[21] Appl. No.: 08/639,013

[22] Filed: Apr. 24, 1996

[51] Int. Cl.[6] .................................................. H04B 15/00
[52] U.S. Cl. ............................... 455/62; 455/63; 455/450
[58] Field of Search ................................. 455/62, 63, 450, 455/451, 452, 455, 464, 509, 517

[56] References Cited

U.S. PATENT DOCUMENTS

| | | |
|---|---|---|
| 4,639,550 | 1/1987 | Yamagawa et al. . |
| 4,650,928 | 3/1987 | Numata . |
| 4,694,485 | 9/1987 | Iwase . |
| 4,768,219 | 8/1988 | Yamagata et al. . |
| 4,783,844 | 11/1988 | Higashiyama et al. . |
| 4,792,984 | 12/1988 | Matsuo . |
| 4,837,801 | 6/1989 | Shimura . |
| 5,044,010 | 8/1991 | Frenkiel et al. ........................ 455/450 |
| 5,093,924 | 3/1992 | Toshiyuki et al. ...................... 455/450 |
| 5,197,093 | 3/1993 | Knuth et al. . |
| 5,203,012 | 4/1993 | Patsiokas et al. ........................ 455/62 |
| 5,260,988 | 11/1993 | Schellinger et al. . |
| 5,295,138 | 3/1994 | Greenberg et al. ...................... 455/63 |
| 5,345,597 | 9/1994 | Strawczynski et al. .................. 455/62 |
| 5,418,839 | 5/1995 | Knuth et al. ............................ 455/465 |
| 5,488,649 | 1/1996 | Schellinger ............................. 455/422 |
| 5,491,837 | 2/1996 | Haartsen ................................. 455/450 |

*Primary Examiner*—Nguyen Vo
*Assistant Examiner*—Sam Bhattacharya
*Attorney, Agent, or Firm*—John J. King

[57] ABSTRACT

A unique method and apparatus determines (310) which channels in a wireless communication system are both authorized for cordless operation and available. A channel is then selectively chosen (328) from this list to reduce the probability that an interferer will be on the chosen channel. For example, the channel could be randomly selected from all available channels or randomly selected from a limited group of available channels to avoid co-channel interference. Alternatively, the channel could be chosen based upon the level of the signal that last caused that channel to be blocked. Finally, the channel could be chosen based upon the number of channels from an available channel to the nearest blocked channel.

13 Claims, 4 Drawing Sheets

METHOD AND APPARATUS FOR ASSIGNING A CHANNEL TO A MOBILE UNIT IN A WIRELESS COMMUNICATION SYSTEM

FIELD OF THE INVENTION

The present invention generally relates to communication devices, and more particularly to a method and apparatus for avoiding interference when assigning a channel in a communication system.

BACKGROUND OF THE INVENTION

Wireless communication devices, such as radiotelephones, which are adapted to communicate with a base station, such as a cordless telephone base station, typically have a predetermined set of channels on which they can transmit and receive radio frequency (RF) signals. A wireless communication device must determine which of the channels are not occupied by another device and are clear to use. Conventional communication devices have generated a prioritized list of available channels. This prioritized list could be based upon the most recently observed radio frequency activity on the given channels. For example, when scanning a list of channels, any channel having interference would be placed at the bottom of the list. Such conventional schemes merely create an ordered list of channels as they are scanned, with channels having interference being placed at the bottom of the list. Other schemes of interference avoidance have been developed wherein each channel of a range of channels is periodically sampled. The system records the number of times interference is detected for each channel over a period of time. A probability of interference for each channel can then be calculated.

However, such methods have significant limitations. For example, a channel at or near the top of the list may not have been clear for a minimum threshold period of time, and therefore, may not be an acceptable channel for communications. Also, when assigning the channel, such conventional systems will typically assign the first available channel on the list, resulting in considerable problems of collision avoidance. For example, two communication devices which are powered up at the same time may select the same channel because they are both employing the same channel selection scheme. This problem would also exist when multiple communication devices are located near each other. Such communication devices running for a period of time would be expected to have similar interference information for channels used by the surrounding system. Also, if the channel at the top of the list is adjacent (i.e., the next sequential channel in frequency) to the channel which is receiving interference, the channel at the top of the list may also be receiving interference. In a system which includes in-call interference detection and channel change, an adjacent channel interferer with a sufficiently strong signal will appear as interference, causing the system to decide to change channels. If the system had no memory of interference on this adjacent channel, it is possible that this adjacent channel would be chosen in the channel change because it is the next sequential channel number. This would cause the communication device to change channels to the channel actually causing the interference.

Accordingly, there is a need for a method and apparatus assigning a channel to a communication device to avoid interference.

DETAILED DESCRIPTION OF THE INVENTION

A unique method and apparatus selectively assigns a channel to a communication device to avoid co-channel interference. In conventional communication systems, two communication devices which are powered up at the same time may select the same channel at the same time if they are both employing the same channel selection scheme. Also, multiple communication devices located near each other for a period of time would be expected to have similar interference information for available channels in the system. These problems are avoided according to the method and apparatus of the present invention by selectively choosing a channel from a list of acceptable candidates.

Wireless communication networks currently being developed allow for communication between a single mobile unit, such as a radiotelephone, and multiple communication systems, including a residential cordless system, a wireless in-building system, as well as wide area communication networks, such as a PCS system, a cellular system or other wireless communication systems. The mobile unit is adapted to communicate with a predetermined system depending upon its location within the relevant systems with which it can communicate. Preferably, the mobile unit will communicate with the system which provides the lowest cost of operation. Such communication systems may utilize cellular spectrum for operation in a cellular mode, a cordless mode or an in-building mode. In order to enable the sharing of spectrum, a wireless communication system comprising a base station and the mobile device must identify which channels are used by the cellular system in the vicinity of the base station. The wireless communication system must then avoid using these channels.

The base station preferably determines which channels are both authorized for cordless operation and available (i.e. preferably have been free from interference at least as long as a specified time, or meets some other channel quality criteria). Channels which are both authorized and available will be referred to as "available" in the remaining portion of the specification. However, for a device operating in a single communication system, a channel would be considered available if it is free from interference for some predetermined period of time. The best channel of all channels which have an interference level below a predetermined maximum could be selected. Alternatively, an available channel could be selectively chosen to reduce the probability that an interferer will be on the chosen channel. The channel could be randomly selected from all available channels or randomly selected from a limited group of available channels. The limited group of available channels could be determined based upon whether the channel has been free of interference for a predetermined period of time or some other criteria which will be set out in more detail below.

Figure 1:
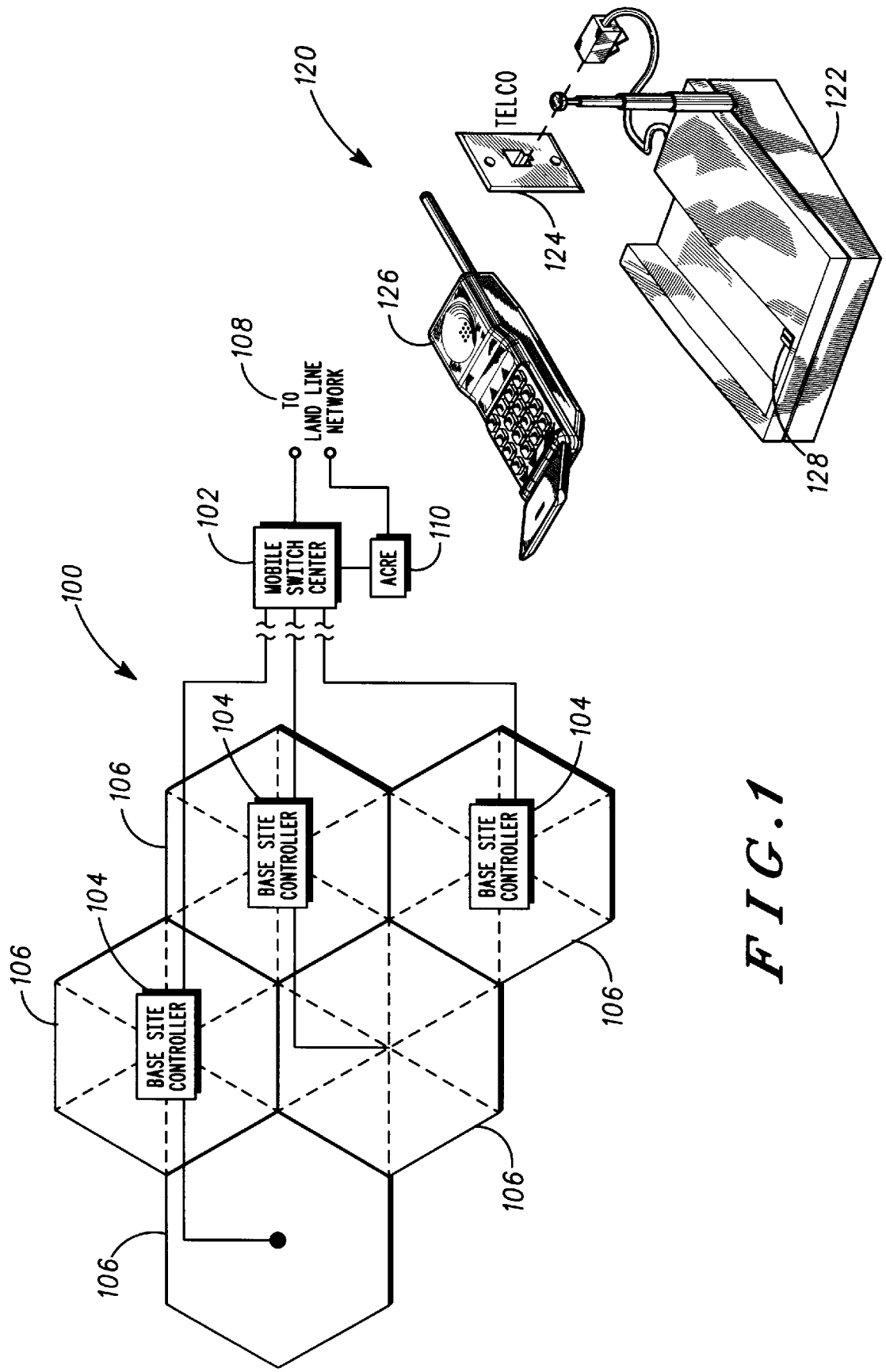
FIG. 1 is system level diagram of a wireless communication system according to the present invention.

Turning first to FIG. 1, a wide area communication network 100, such as a cellular radio telephone system, a PCS system, a paging system or some other wireless network, comprises a mobile switch center 102 connected to a plurality of base site controllers 104 in cells 106. Mobile switch center 102 is also preferably coupled to a landline communication network 108. Authorization and Call Routing Equipment (ACRE) 110 is coupled to the mobile switch center 102, or could be coupled directly to a landline communication network 108 or any other communication network. ACRE 110 provides call routing information to a telephone switching system. The switching system automatically routes phone calls between cellular, microcellular and cordless systems, or other communication networks. ACRE 110 also authorizes communication with a communication system 120 having a base station 122 and a mobile unit 126, such as residential or in-building wireless communication systems. Base station 122 is preferably coupled to a TELCO 124. ACRE 110 also can provide a list or range of channels on which communication system 120 may operate.

Base station 122 further includes charging contacts 128 which are adapted to couple to corresponding charging contacts on a battery associated with mobile unit 126. The charging contact arrangement will be shown in more detail in reference to FIG. 2. Mobile unit 126 is adapted to communicate with one or more communication networks, such as the wide area communication network 100 or base station 122 by way of radio frequency (RF) communication signals.

Figure 2:
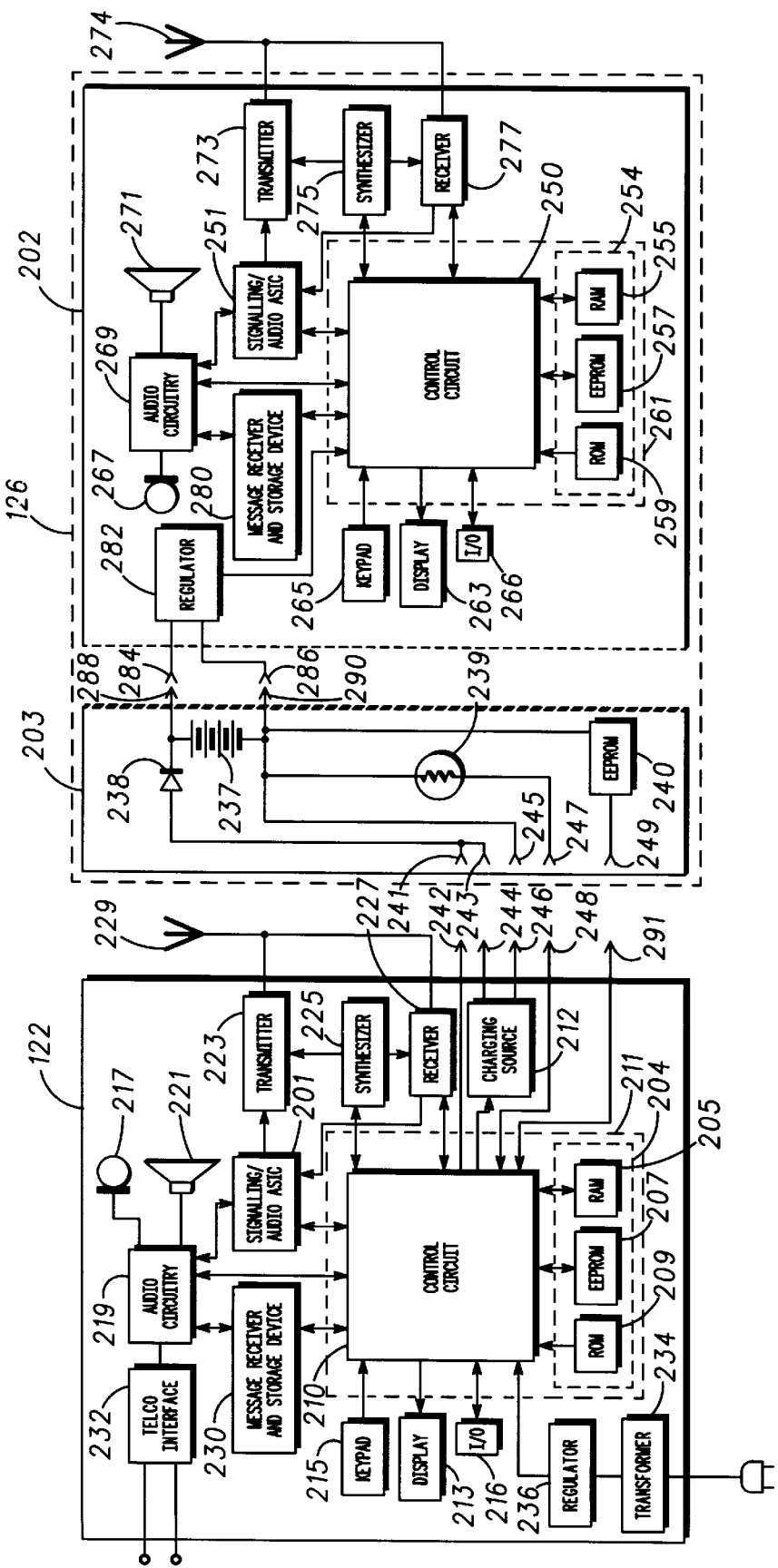
FIG. 2 is a block diagram of a wireless communication device for assigning a channel according to the present invention.

Turning now to FIG. 2, a block diagram shows a base station and mobile unit for assigning a channel according to the present invention. In the preferred embodiment, base station 122 comprises a signaling ASIC 201, such as a CMOS ASIC available from Motorola, Inc. and a control circuit 210, such as a 68HC11 microprocessor also available from Motorola, Inc., which combine to generate the necessary communication protocol for transmitting RF communication signals to and receiving RF communication signals from mobile unit 126. Control circuit 210 uses memory 204 comprising RAM 205, EEPROM 207, and ROM 209, preferably consolidated in one package 211, to execute the steps necessary to generate the protocol and to perform other functions for the base station, such as writing to a display 213, accepting information from a keypad 215, accepting input/output information by way of a connector 216 or controlling a frequency synthesizer 225. ASIC 201 processes audio transformed by audio circuitry 219 from a microphone 217 and to a speaker 221.

A transceiver processes the radio frequency signals, preferably from mobile unit 126. In particular, a transmitter 223 transmits through an antenna 229 using carrier frequencies produced by a frequency synthesizer 225. Information received by an antenna 229 enters receiver 227 which demodulates the symbols using the carrier frequencies from frequency synthesizer 225. The base station may optionally include a message receiver and storage device 230 including digital signal processing means. The message receiver and storage device could be, for example, a digital answering machine or a paging receiver. Base station 122 further includes a TELCO interface 232 coupled to audio circuitry. The base station is connected to a standard telephone system network by means of a standard telephone cord. When installed, access to the telephone system is provided whereby the base station can accept signals from and provide signals to other units connected in the telephone network. A transformer 234 coupled to receive an external source of power and a regulator 236 provide a regulated source of power to control circuit 210 and other components of base station 122. Finally, base station 122 includes a charging source 212 for charging a battery associated with mobile unit 126.

Mobile unit 126 associated with base station 122 includes battery 203, which preferably comprises a rechargeable battery 237, a diode 238, a thermistor 239 and an EEPROM 240. Diode 238 is coupled to a positive terminal of battery 237 and a charging contact 243 which is adapted to be coupled to a charging contact 244 of base system 122. Diode 238 is optional and may be included to prevent discharging of the battery if charging contact 243 is shorted to ground or when the battery is mated with the base station 122. Alternatively, a diode or other means for preventing discharge of the battery could be incorporated in base station 122. The negative terminal of battery 237 is coupled to the ground contact 245 which is adapted to mate with ground contact 246 of base station 122. Additionally, thermistor 239 could be coupled between ground contact 245 and contact terminal 247. Contact terminal 247 is adapted to be coupled to terminal 248 of base station 122. Thermistor 239 could be used to identify information about the battery, such as the temperature of the battery. Battery 203 preferably includes a contact 241 which is either coupled to contact 242 or provides an open circuit. This enables the base station to identify the battery type when coupled to contact 242 of the base station. Alternatively, contact 241 could be coupled to a discrete resistor within the battery to enable control circuit 210 to identify the type of battery when contact 241 is coupled to contact 242.

EEPROM 240 is preferably coupled to a contact terminal 247 adapted to mate with a corresponding contact 291 of base station 122. EEPROM 240 could store information relevant to the battery to enable the base station to correctly charge the battery. Control circuit 210 could control charging source 212 differently depending upon the determination of the type of battery or information received from EEPROM 240. For example, different charging parameters may be used to charge a lithium ion battery, a nickel cadmium battery or a nickel metal hydride battery. Additional contacts could be used to enable the exchange of signals with base station 122 and/or transceiver portion 202 of a mobile unit 126 as required.

Referring now to the mobile unit portion of FIG. 2, mobile unit 126 also includes a transceiver portion 202 which preferably comprises a signaling/audio ASIC 251, such as a CMOS ASIC available from Motorola, Inc. and a control circuit 250, such as a 68HC11 microprocessor also available from Motorola, Inc., or some other processing circuit, which combine to generate the necessary communication protocol for communicating with base station 122 and independently with wide area communication network 100 of FIG. 1. Control circuit 250 uses memory 254 comprising RAM 255, EEPROM 257, and ROM 259, preferably consolidated in one package 261, to execute the steps necessary to generate the protocol and to perform other functions for the wireless communication device, such as writing to a display 263, accepting information from a keypad 265, accepting input/output information by way of a connector 266, or controlling a frequency synthesizer 275. ASIC 251 processes audio transformed by audio circuitry 269 from a microphone 267 and to a speaker 271.

Transceiver portion 202 processes the radio frequency signals. In particular, a transmitter 273 transmits through an antenna 274 using carrier frequencies produced by a frequency synthesizer 275. Information received by antenna 274 of the mobile unit enters receiver 277 which demodulates the symbols using the carrier frequencies from frequency synthesizer 275. The mobile unit may optionally include a message receiver and storage device 280 including digital signal processing means. Transceiver portion 202 further includes a regulator 282 coupled to power contact 284 and ground contact 286 to provide a regulated voltage to control circuit 250 and other components.

Figure 3:
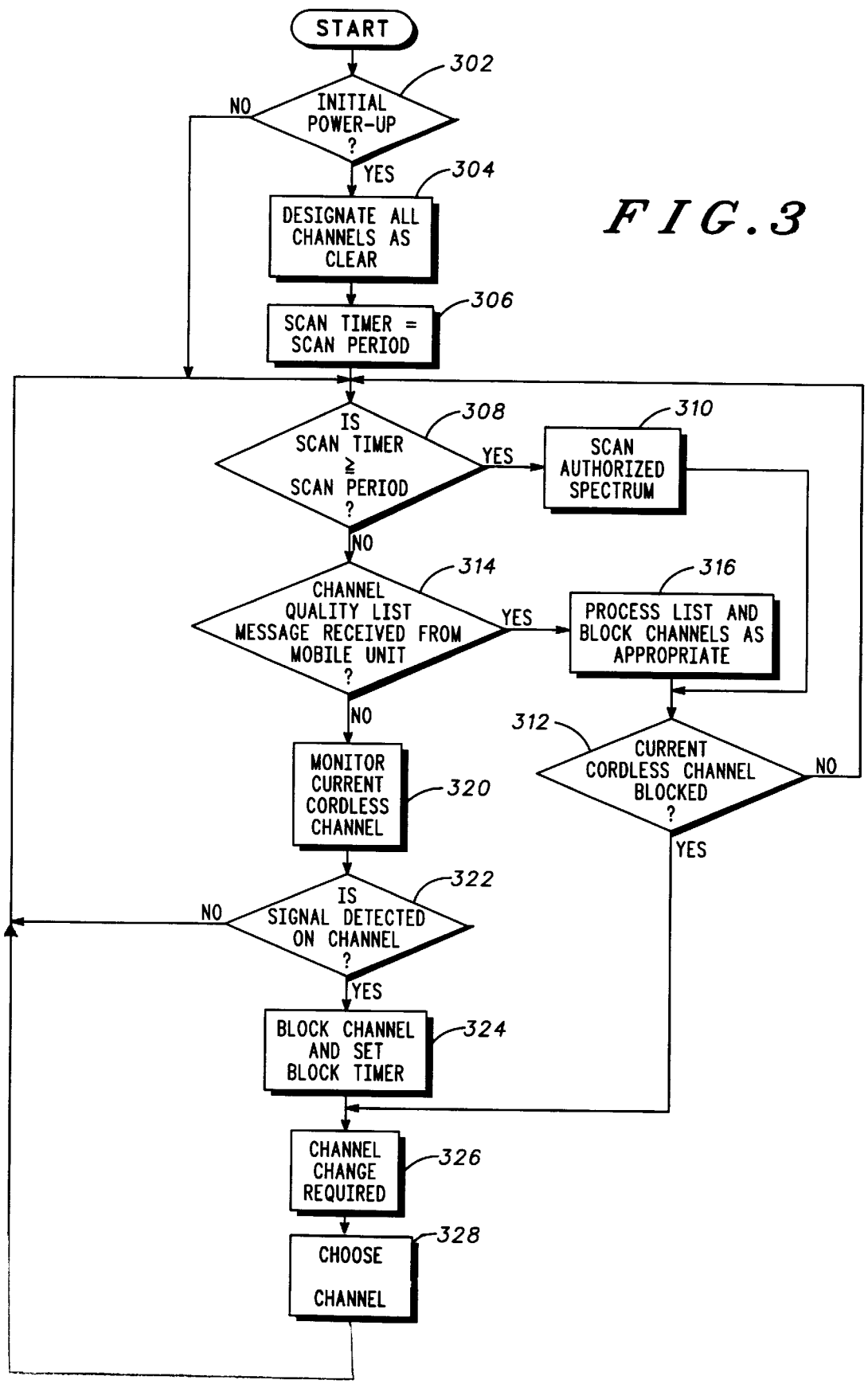
FIG. 3 is a flow chart showing the method for assigning a channel according to the present invention.

Turning now to FIG. 3, the method for assigning channels according to the present invention is shown. The following description makes reference to the cordless operation of a system adapted to communicate in both cellular and cordless modes. However, the method of the present invention could apply to any wireless communication device, such as a cordless telephone. Thus, if the base station is initially powering-up at a step 302, all channels will be designated as unblocked (i.e., clear or free from interference). Alternately, all channels could be initially blocked (i.e., generally not free from some interference within a certain period of time). Thirdly, available channels could be determined upon an initial scan. The base station must periodically scan channels to determine whether there is RF interference on any of the available channels, and sets a SCAN TIMER. Alternatively, rather than detecting RF interference, the base station could detect a different ID code intended for another base station, or signaling from another communication system, such as a supervisory audio tone (SAT). The SCAN TIMER function could be performed, for example, by a microprocessor. Preferably, all authorized channels are periodically scanned when not in a call, and channels are blocked for a specified amount of time ("block time") after detecting RF interference on the channel. After the block time has passed, the channel may be used for cordless service. If a signal is detected on the channel while it is blocked, the block timer for the channel is reset to ensure that no signal has been detected on this channel for the full block time before the channel may be utilized for cordless operation. The block timer could be set by a program run by control circuit 210 and the time maintained by the control circuit. Such internally run timers are well known in the art of microprocessor applications.

The base station then sets the SCAN TIMER equal to the SCAN PERIOD at a step 306. The mobile determines whether the SCAN TIMER is greater than or equal to the SCAN PERIOD at a step 308. If the SCAN TIMER is greater than or equal to the SCAN PERIOD, then the mobile scans authorized spectrum at a step 310. The SCAN TIMER is initially set equal to the SCAN PERIOD at step 306 to ensure that the spectrum is scanned after power up at step 310. The method for scanning channels will be described in more detail in reference to FIG. 4. The base station then determines whether the current cordless channel has become blocked at a step 312.

If the SCAN TIMER is less than the SCAN PERIOD, the base station determines whether a channel quality list message is received from the mobile unit. The message would provide channel quality information based upon, for example, RSSI measurements from the mobile unit. However, the channel quality could be based upon some other measure, such as bit error rate. For example, a low bit error may indicate that a data modulated signal is present on the channel. If the channel quality list message has been received, the base station then processes the list and blocks the appropriate channels at a step 316. Preferably, the base unit will determine whether a channel is available based upon RSSI measurements for both the mobile unit and the base station. Separate block timers could be set for the channels detected by the base station and the mobile unit. For example, the block times for the base station are preferably longer than the block time for the mobile unit. The base station will typically be in an environment such as a home which may be shielded from RF interference. However, the block times could be the same, or the block times for the mobile unit could be longer than the block times for the base station.

Also, the decision to block a channel could be based upon a measurement from either the base station or the mobile unit. Further, the mobile unit, rather than the base station, could make the determination of whether to block a channel, based upon its own RSSI measurement, the measurement of the base station, or a combination of the two measurements. The remaining description of the method for assigning a channel based upon a base unit blocking channels based upon measurements from both the base station and the mobile unit is merely given by way of example. The following description could apply to any other arrangement for blocking channels described above.

The base station then determines whether the current cordless channel has become blocked at a step 312. If the cordless channel is not blocked, the base station again checks the scan timer at a step 308. If the channel quality list message is not received at step 314, the base station continues to monitor the current cordless channel at a step 320. The base station then determines whether an interfering signal is detected on the cordless channel at a step 322. Examples of interfering signal are signals for which data cannot be decoded, or for data can be decoded but that is not intended for this unit. If a signal is detected, the base station blocks the channel and sets a block timer at a step 324, and then prepares a channel change at a step 326.

When a channel change must be performed, as when another signal or some other RF interference is detected on the current channel, the base station must choose a new channel that has been clear of interference for at least some specified minimum time, referred to as the "minimum block time". Such a channel is an available channel. In one embodiment, when choosing a channel at a step 328, the base station looks through a list of available channels, finding the "best available channel." The "best available channel" could be the channel that has been free from interference for the longest period of time. However, any other channel quality criteria could be used for determining the "best available channel", such as the level of the interfering signal or the number of channels to the nearest channel having interference. Often, there may be a number of available channels that have an equal value for a given channel quality criteria. In an alternate embodiment, the base station will then selectively choose a channel from the group of best available channels. In the preferred embodiment, if no channels are available, the transmitter of the base station will be turned off.

In an alternate embodiment, a channel other than the "best available channel" may be selectively chosen to reduce the probability that interference will be found on the new channel. That is, the group of channels from which the new channel is selected could include more than the best available channels. For example, the channel could be randomly selected from all available channels. This solves the problem of two or more communications devices which are powered up at the same time selecting the same channel. By choosing a channel randomly from the available channels, the units would have a lower probability of selecting the same channel.

Similarly, units which are located near each other can have similar information for channels occupied by the surrounding system. Accordingly, base stations will be likely to select the same channel when required to make a channel change. However, each base station has a lower probability of selecting the same channel when performing a simultaneous or near simultaneous channel change when the channel is randomly selected than if they each choose their respective "best available channel". Also, the system will have a lower likelihood of moving into an adjacent channel interferer in the case where the interference that forced a channel change was actually caused by an adjacent channel interferer.

A random generator function with a uniform distribution could be used to randomly select a channel. In other words, all available channels would have an equal probability of being chosen. For the uniform distribution case, P(x) is the same for all channels:

$$P(x) = \frac{1}{N}$$

where N is the number of available channels.

According to an alternate embodiment, the base station could generate a distribution with a non-uniform weighting, where the probability of a channel being chosen is based on one or more factors. For example, the probability of a channel being chosen could be a function of the time that the channel had been free from interference. If this function is a linear function of the time that the channel has been available, then channels which have been interference-free for the longer times would have higher probabilities of being chosen. As an equation, this can be expressed as $$P(x) = A \cdot block\_timer(x)$$

where P(x) is the probability of channel x being chosen, A is a gain constant, and block_timer(x) is the amount of time that the channel has been free of interference. To meet the condition that $$\sum_N P(x) = 1$$

where N is the number of available channels, $$A = \frac{1}{\sum_N block\_timer(x)}.$$

Another interesting case gives greater weight to the channels which have been interference-free for the longest times. One example of such a probability distribution is:

$$P(x) = A \cdot [block\_timer(x)]^R$$

where A is a constant, and R determines the extent to which the channels with the longer interference-free times will be favored. To meet the condition that $$\sum_N P(x) = 1$$

where N is the number of available channels, $$A = \frac{1}{\left[\sum_N block\_timer(x)\right]^R}.$$

In the case where R=1, this reduces to the linear example above. As R is increased, greater weight is given to the channels which have been free from interference for the longest times. As R approaches ∞, this reduces to the case of selecting the channel that has been interference-free for the longest time. In addition, setting R=0 returns to the uniform distribution case.

The following table 1 illustrates an example for 4 available channels with block timer values of 1, 3, 5, and 9 for R values of 0, 0.5, 1, 2, 3, 10 and 100. R values between 0 and 1 give more weight to the channels that have been clear for a longer time, but not as much weight as the linear case (R=1).

| Channel | block timer | [block timer]^R | P(x) |
|---|---|---|---|
| R = 1 | | | |
| 1 | 1 | 1 | 0.0556 |
| 2 | 3 | 3 | 0.1667 |
| 3 | 5 | 5 | 0.2778 |
| 4 | 9 | 9 | 0.5000 |
| sum ([block timer]^R) | | 18 | |
| sum (P(x)) | | | 1.0000 |
| R = 2 | | | |
| 1 | 1 | 1 | 0.0086 |
| 2 | 3 | 9 | 0.0776 |
| 3 | 5 | 25 | 0.2155 |
| 4 | 9 | 81 | 0.6983 |
| sum ([block timer]^R) | | 116 | |
| sum (P(x)) | | | 1.0000 |
| R = 3 | | | |
| 1 | 1 | 1 | 0.0011 |
| 2 | 3 | 27 | 0.0306 |
| 3 | 5 | 125 | 0.1417 |
| 4 | 9 | 729 | 0.8265 |
| sum ([block timer]^R) | | 882 | |
| sum (P(x)) | | | 1.0000 |
| R = 10 | | | |
| 1 | 1 | 1 | 0.0000 |
| 2 | 3 | 59049 | 0.0000 |
| 3 | 5 | 9765625 | 0.0028 |
| 4 | 9 | 3486784401 | 0.9972 |
| sum ([block timer]^R) | | 3496609076 | |
| sum (P(x)) | | | 1.0000 |
| R = 100 | | | |
| 1 | 1 | 1 | 0.0000 |
| 2 | 3 | 5.15378E+47 | 0.0000 |
| 3 | 5 | 7.88861E+69 | 0.0000 |
| 4 | 9 | 2.65614E+95 | 1.0000 |
| sum ([block timer]^R) | | 2.65614E+95 | |
| sum (P(x)) | | | 1.0000 |
| R = 0 | | | |
| 1 | 1 | 1 | 0.2500 |
| 2 | 3 | 1 | 0.2500 |
| 3 | 5 | 1 | 0.2500 |
| 4 | 9 | 1 | 0.2500 |
| sum ([block timer]^R) | | 4 | |
| sum (P(x)) | | | 1.0000 |
| R = 0.5 | | | |
| 1 | 1 | 1 | 0.1255 |
| 2 | 3 | 1.732050808 | 0.2174 |
| 3 | 5 | 2.236067977 | 0.2806 |
| 4 | 9 | 3 | 0.3765 |
| sum ([block timer]^R) | | 7.968118785 | |
| sum (P(x)) | | | 1.0000 |

In yet another embodiment, a subset of available channels is created by including a specified number of channels in the selection pool that have the highest block timer values. The channel is then chosen randomly from this subset. This weights the selection toward the channels with the longest interference-free times, while still providing a large enough pool of channels to lower the probability of interference caused by selecting the "best available channel." Any method for selecting the random channel described above could be used.

The above examples used the value of the block timers to determine the probability of a channel being chosen. Other criteria may be used. For example, the level of the interfering signal last detected on the channel could be used to determine the probability of a channel being chosen.

According to another embodiment of the present invention, the level of the interfering signal detected on the channel could be used to determine the amount of time to block the channel. A channel is still blocked for a minimum amount of time after a signal which exceeds the RF threshold is detected. The amount of time that the channel will be blocked is a function of the RF level that was detected on the channel.

One such function is $$block\_time = minimum\_block\_time + A \cdot (RF\_level - RF\_threshold)$$

where block_time is the amount of time to block the channel from usage, A is a gain constant in units of time/dB, RF_level is the measured level of the interfering signal, and RF_threshold is the RF level at which the channel should be blocked.

The following table illustrates an example of this function, where the minimum block time is 60 minutes, the RF threshold is −90 dBm and A is equal to 2 minutes/dB.

TABLE 2

| RF LEVEL (dBm) | BLOCK TIME (mins) |
| --- | --- |
| −90 | 60 |
| −85 | 70 |
| −80 | 80 |
| −75 | 90 |
| −70 | 100 |
| −65 | 110 |
| −60 | 120 |
| −55 | 130 |
| −50 | 140 |

The probability of a channel being chosen could be based upon a combination of the measured level of the interfering signal and any other criteria described above, such as the value of the block timers.

Yet another embodiment of the present invention weights the selection of the channel toward the channels which have been free from interference for the longest times in another manner, but still uses random selection to avoid potential interference problems created by choosing the best available channel. In this embodiment, the channel is chosen from among the available channels which meet a second criteria which is higher than the minimum block time. For example, the channel could be chosen from all of the channels that have been interference-free for at least two times the minimum block time. Another criteria which could be used to weight the channel selection is the distance from the available channel to the nearest blocked channel. This criteria emphasizes a reduced probability of co-channel and adjacent-channel interference. Alternatively, the channel could be chosen based upon any combination of the above factors.

Although the methods for selectively choosing channels described above have referred to available channels, the methods could be used to select channels from any other group of channels, such as all of the authorized channels. Also, the methods of choosing a channel at step 328 could be performed at any time regardless of whether a channel change is required at step 326. Therefore, the next channel to be used could be determined before it is actually required to provide more efficient channel changing. This would enable the base station to inform the handset of the next channel.

Figure 4:
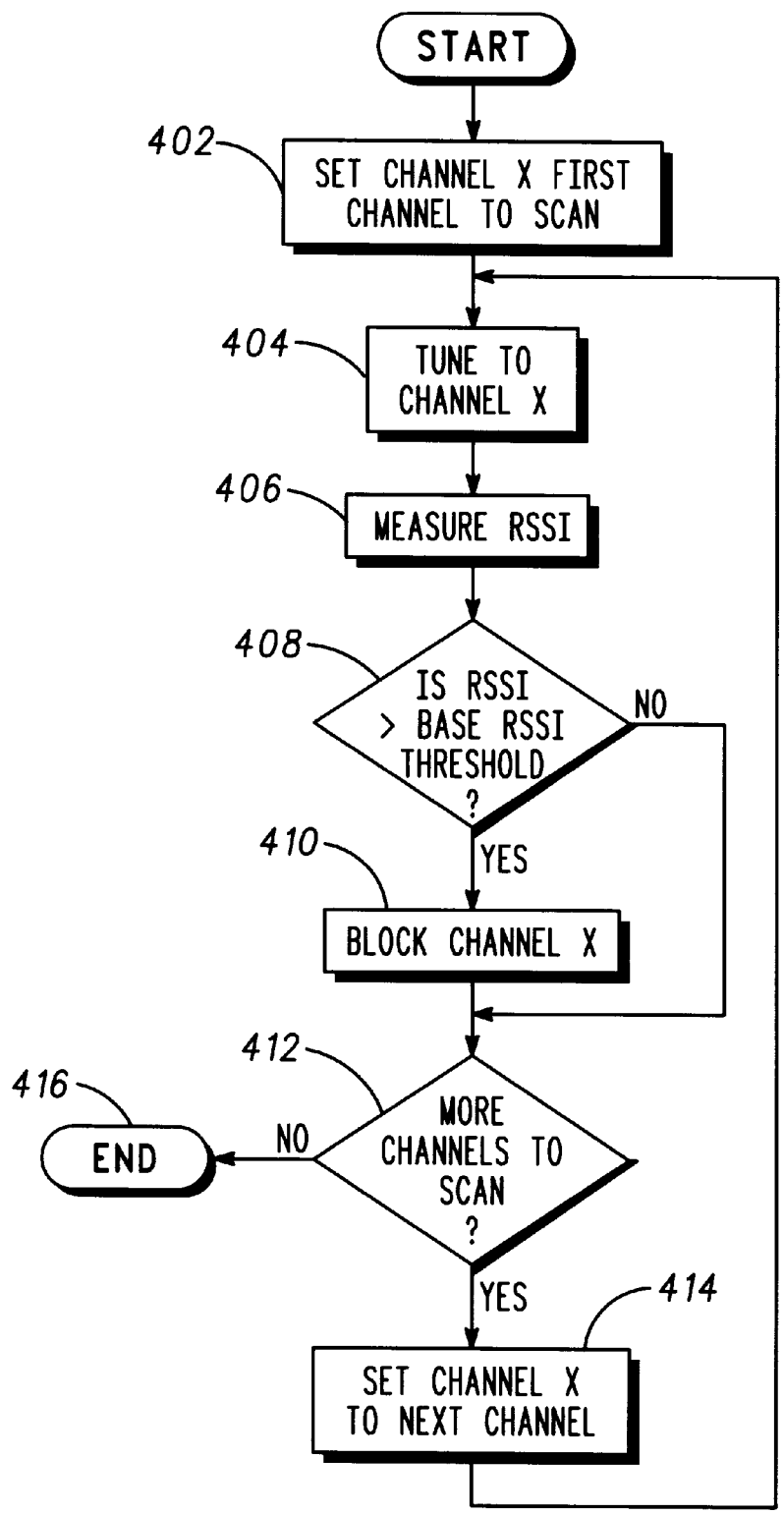
FIG. 4 is a flow chart showing the preferred method for scanning authorized channels according to block 310 of FIG. 3.

Turning now to FIG. 4, a block diagram shows the preferred method for scanning channels at step 310 of FIG. 3. The method for scanning channels is preferably performed independently by both the mobile unit and the base station. The following description of scanning by the base station is merely given by way of example. The same method could be used by the mobile unit. The base station sets channel X to the first channel to scan at a step 402. The base station then tunes to channel X at a step 404 and measures the receiver signal strength indication (RSSI) at a step 406. The base station then determines whether the RSSI is greater than a predetermined base RSSI threshold at a step 408. The maximum threshold could be −90 dBm, and is determined by a system provider for the wireless communication network. If the RSSI is greater than the threshold, the base station blocks the channel at a step 410. Otherwise, the base station determines whether there are more channels to scan at a step 412. If there are more channels, the base station sets channel X to the next channel at a step 414 and tunes to channel X at step 404.

Although the invention has been described and illustrated in the above description and drawings, it is understood that this description is by way of example only and that numerous changes and modifications can be made by those skilled in the art without departing from the true spirit and scope of the invention. Although the present invention finds particular application in portable cellular radiotelephones, the invention could be applied to any wireless communication device, including cordless telephones, pagers, electronic organizers, or computers. My invention should be limited only by the following claims.

I claim:

1. A method for assigning a channel to a mobile unit operating in a wireless communication system comprising the steps of:

periodically scanning a predetermined set of channels;

establishing a list of available channels of said predetermined set of channels;

providing a weighted value which is a multiple of the time a channel is free from interference raised to an exponential value to each said available channel of said predetermined set of channels;

monitoring a current channel of said predetermined set of channels;

detecting interference on said current channel; and selectively choosing a new channel from said list of available channels to reduce the probability of interference on said new channel.

2. The method for assigning a channel of claim 1 further including a step of establishing a maximum threshold, wherein a radio frequency level of said available channels is below said maximum threshold.

3. The method for assigning a channel of claim 1 wherein said step of selectively choosing a new channel comprises randomly selecting a channel.

4. The method for assigning a channel of claim 1 wherein said step of selectively choosing a new channel comprises choosing a channel based upon how long an available channel has been free from interference.

5. The method for assigning a channel of claim 1 wherein said step of selectively choosing a new channel comprises choosing a channel based upon the level of a signal that caused interference on an available channel.

6. The method for assigning a channel of claim 1 wherein said step of selectively choosing a new channel comprises choosing a channel based upon the number of channels from an available channel to the nearest channel having interference.

7. The method for assigning a channel of claim 1 wherein said step of selectively choosing a new channel comprises selecting a channel based upon said weighted value.

8. The method for assigning a channel of claim 1 wherein said step of selectively choosing a new channel comprises determining channel quality for each said available channel based upon a combination of two or more of the following criteria:

determining how long a channel has been free from interference;

determining a level of the interfering signal on each said available channel; and determining a number of channels from each said available channel to a nearest blocked channel.

9. The method for assigning a channel of claim 1 further including a step of establishing a period of time to make a channel of said predetermined set of channels unavailable.

10. The method for assigning a channel of claim 9 wherein said step of establishing a period of time comprises summing a minimum value plus an offset value based upon the level of a signal which caused interference on the channel.

11. A method for assigning a channel to a mobile unit operating in a wireless communication system comprising the steps of:

periodically scanning a predetermined set of channels;

establishing a list of available channels of said predetermined set of channels wherein said step of establishing a period of time comprises summing a minimum value plus an offset value based upon the level of the signal which caused interference on the channel, wherein said offset value proportional to the difference between the level of the signal which caused the interference on the channel and a minimum value;

monitoring a current channel of said predetermined set of channels;

detecting interference on said current channel; and selectively choosing a new channel from said list of available channels to reduce the probability of interference on said new channel.

12. A method for assigning channels in a wireless communication system having a mobile unit and a base station, said mobile unit adapted to operate in cordless telephone mode on a predetermined set of channels when within range of said base station, and a cellular mode, said method comprising the steps of:

periodically scanning said predetermined set of channels;

establishing a list of available channels of said predetermined set of channels wherein a radio frequency interference level of said available channels is below a maximum threshold;

monitoring a current channel of said predetermined set of channels;

detecting interference on said current channel;

randomly choosing a new channel from said list of available channels to reduce the probability of interference on said new channel; and providing a weighted value which is a multiple of the time a channel is free from interference to each said available channel of said predetermined set of channels.

13. The method for assigning channels of claim 12 wherein said step of providing a weighted average comprises providing a weighted value which is a multiple of the time an available channel is free from interference raised to an exponential value.

* * * * *